United States Patent
Kingham et al.

(10) Patent No.: US 9,852,816 B2
(45) Date of Patent: Dec. 26, 2017

(54) EFFICIENT COMPACT FUSION REACTOR

(75) Inventors: David Kingham, Oxfordshire (GB);
Alan Sykes, Wantage (GB); Mikhail Gryaznevich, Abingdon (GB)

(73) Assignee: TOKAMAK ENERGY LTD, Oxfordshire (GB)

( * ) Notice: Subject to any disclaimer, the term of this patent is extended or adjusted under 35 U.S.C. 154(b) by 698 days.

(21) Appl. No.: 14/240,809

(22) PCT Filed: Aug. 24, 2012

(86) PCT No.: PCT/GB2012/052093
§ 371 (c)(1),
(2), (4) Date: Feb. 25, 2014

(87) PCT Pub. No.: WO2013/030554
PCT Pub. Date: Mar. 7, 2013

(65) Prior Publication Data
US 2014/0211900 A1 Jul. 31, 2014

(30) Foreign Application Priority Data

Sep. 2, 2011 (GB) .................................. 1115188.3
Jul. 10, 2012 (GB) .................................. 1212241.2

(51) Int. Cl.
*G21B 1/05* (2006.01)
*H05H 1/12* (2006.01)

(52) U.S. Cl.
CPC ............... *G21B 1/057* (2013.01); *H05H 1/12* (2013.01); *Y02E 30/122* (2013.01); *Y02E 30/126* (2013.01); *Y02E 30/128* (2013.01)

(58) Field of Classification Search
None
See application file for complete search history.

(56) References Cited

U.S. PATENT DOCUMENTS

| 4,370,296 A | 1/1983 | Bussard |
| 2010/0046688 A1* | 2/2010 | Kotschenreuther ...... G21B 1/05 376/134 |

FOREIGN PATENT DOCUMENTS

WO 2011154717 A1 12/2011

OTHER PUBLICATIONS

"Materials and Technology," Annual Report of the EURATOM/UKAEA Fusion Programme Sep. 2008.*

(Continued)

*Primary Examiner* — Jack W Keith
*Assistant Examiner* — John T Nolan
(74) *Attorney, Agent, or Firm* — Cantor Colburn LLP

(57) ABSTRACT

An efficient compact nuclear fusion reactor for use as a neutron source or energy source is described. The reactor comprises a toroidal plasma chamber and a plasma confinement system arranged to generate a magnetic field for confining a plasma in the chamber. The plasma confinement system is configured so that a major radius of the confined plasma is 1.5 m or less. The reactor is constructed using high temperature superconducting toroidal magnets, which may be operated at low temperature (77K or lower) to provide enhanced performance. The toroidal magnetic field can be increased to 5 T or more giving significant increases in fusion output, so that neutron output is very efficient and the reactor can produce a net output of energy.

17 Claims, 4 Drawing Sheets

(56) References Cited

OTHER PUBLICATIONS

"The ITER Magnet System," N. Mitchell, D. Bessette, R. Gallix, C. Jong, J. Knaster, P. Libeyre, C. Sborchia, and F. Simon.*

"The Alcator C-Mod Program," E.S. Marmar and the Alcator C-Mod Group.*

Garstka et al., "The upgraded Pegasus Toroidal Experiment," Nucl. Fusion 46 (2006) S603-S612.*

International Preliminary Report on Patentability for corresponding application PCT/GB2012/052093 filed Aug. 24, 2012; dated Mar. 4, 2014.

Jassby D L., "Optimisation of Fusion Power Density in the Two Energy Component Tokamak Reactor" Nuclear Fusion 1975 vol. 15 p. 453.

Y-K M Peng et al., "A component test facility based on the spherical tokamak", Plasma Phys. Control. Fusion 47 (2005) B263-B283.

M. Kotschenreuther, P. Valanju, S. Mahajan, L.J. Zheng, L.D. Pearlstein, R.H. Bulmer, J. Canik and R. Maingi "The super X divertor (SXD) and a compact fusion neutron source (CFNS)" Nucl. Fusion 50 (2010) 035003 (8pp).

R M O Galvao et al, "Physics and Engineering Basis of a Multi-functional Compact Tokamak Reactor Concept", paper FT/P3-20, IAEA conf 2008.

B V Kuteev et al, "Plasma and Current Drive parameter options for a low-power Fusion Neutron Source", 23rd IEEE/NPSS Symposium on Fusion Engineering, 2009. SOFE 2009.

D L Jassby, "PITR-A Small Aspect Ration, Small Major Radius Ignition Test Reactor" Comments Plasma Phys. Controlled Fusion, 3 (1978) 151.

Y-K.M. Peng and D.J. Strickler, "Features of Spherical torus plasmas", Nucl. Fusion 26, 769 (1986). This article has been downloaded from IOPscience, http://iopscience.iop.org/0029-5515/26/6/005.

M Gryaznevich et al., "Achievement of Record b in the START Spherical Tokamak", Physical Review Letters, 80, (1998) 3972.

O. Mitarai and Y. Takase, "Plasma current ramp-up by the outer vertical field coils in a spherical tokamak reactor", Fusion Sci. Technol. 43 (2003).

V. Shevchenko, "Electron Bernstein wave assisted plasma current start-up in MAST", IOP Publishing and International Atomic Energy Agency Nuclear Fusion vol. 50 (2010) p. 22004.

Y-K M Peng and J B Hicks, "Engineering Feasibility of Tight Aspect Ration Tokamak (Spherical Torus) Reactors" Proceedings of the 16th Symposium on Fusion Technology, London, U.K., Sep. 3-7, 1990, vol. 2 p. 1288.

A. Sykes et al, "Fusion for Neutrons a realizable fusion neutron source", Proc of 24th IEEE Symposium on Fusion Engineering, Chicago 2011 Invited Paper SO2B-1, IEEE Transactions on Plasma Science, vol. 40, No. 3, Mar. 2012.

V. Selvamanickam, "2G HTS Wire for High Magnetic Field Applications," HTS4Fusion Conductor Workshop, May 26-27, 2011, Karlsruhe, Germany.

M.Valovic et al, "Collisionality and safety factor scalings of H-mode energy transport in the MAST spherical tokamak", Nuclear Fusion 51 (2011) 073045.

C Hellesen et al,"Neutron emission generated by fast deuterons accelerated with ion cyclotron heating at JET" Nuclear Fusion 50 (2010) 022001.

R D Stambaugh et al,, "The Spherical Tokamak Path to Fusion Power•", Fusion Technology vol. 33 P1 (1998).

T C Hender et al, •Spherical Tokamak Volume Neutron Source•, Fusion Engineering and Design 45 (1999) p. 265-279.

H R Wilson et al , "The Physics Basis of a Spherical Tokamak Component Test Facility", 31st EPS Conference on Plasma Phys. London, Jun. 28-Jul. 2, 2004 ECA vol. 28G, P-4.196 (2004).

G M Voss et al, "Conceptual design of a Component Test Facility based on the Spherical Tokamak", Fusion Engineering and Design 83 (2008) 1648-1653.

A Dnestrovskij et al, "Plasma Devices and Operations", vol. 15, No. 3, Sep. 2007, 209-218, http://www.tandfonline.com/loi/gpdo20.

C. Rizzello, et al., "Overview of the tritium system of Ignitor", Fusion Engineering and Design 83 (2008) 594-600.

L. Bromberg, et al., "Options for the use of high temperature superconductor in tokamak fusion reactor designs", Fusion Engineering and Design 54 (2001) 167-180.

P. Batistoni, et al., "Ignitor neutronics and activation", Fusion Engineering and Design 31 (1996) 53-68.

P. Komarek, "Potential and desire for HTS application in thermonuclear fusion", Fusion Engineering and Design 81 (2006) 2287-2296.

S.Rollet, "Absorbed dose calculations for the Ignitor tokamak magnet coils insulator", Nuclear Instrument and Methods in Physics Research B 166-167 (2000) 826-830.

T. Isono, et al., "Design study of superconducting coils for the fusion DEMO plant at JAERI", Fusion Engineering and Design (2006) 1257-1261.

China Electrical Engineering Canon vol. 1: Modern Electrical Engineering Basics; China Electric Power Press; Jan. 2009; pp. 922; ISBN/ISSN : 9787508370682.

Chinese Office Action for corresponding application 2012800423325; Office Action dated Aug. 6, 2015.

Craig H. et al., Realizing "2001: A Space Odyssey": Piloted Spherical Torus Nuclear Fusion Propulsion; Journa of spacecraft and rockets, vol. 39, No. 6, pp. 874-885, Dec. 2002.

E. A. Azizov, et al, "The development of low aspect ratio tokamaks in Russia"; Fusion Engineering and Design, vol. 70, No. 1, p. 45-56, Jan. 2004.

Jeffrey Freidberg, Plasma Physics and Fusion Energy; p. 499, Science Press, Nov. 2010.

Li Yulin, "New Study on Energy"; Commercial Press (HK); Mar. 1978; pp. 80-82.

Shi Bingren, Principles and Practice of Magnetic Confinement Fusion. Beijing: Atomic Energy Press, Dec. 1999: pp. 196.

International Search Report for corresponding application PCT/GB2012/052093 filed Aug. 24, 2012; dated Feb. 14, 2013.

Sykes, et al., "The Development of the Spherical Tokamak" Internet Citation, Sep. 1, 2008 (Sep. 1, 2008), pp. 1-62, XP002655495, Retrieved from the Internet:URL:http://www.triam .kyushu-u.ac.jp/l CPP/program/download/12-PL01.pdf [retrieved on Aug. 2, 2011] the whole document.

Bush C E et al : "Combined H-modes in DD and DT pl asmas i n TFTR" ,Plasma Physi cs and Controlled Fusion, IOP, Bristol, GB, vol . 38, No. 8, Aug. 3, 2011 (Aug. 3, 2011) pp. 1353-1357, XP002655504.

Galvo et al., "Physics and Engineering Basis of Multi-functional Compact Tokamak Reactor Concept", Proceedings of the 22nd IAEA Fusion Energy Conference—Geneva, Oct. 13-18, 2008, Mar. 27, 2009 (Mar. 27, 2009), pp. 1-8, XP002691321,Retrieved from the Internet: URL :http://www-naweb.i aea.org/napc/physics/FEC/FEC2008/papers/ft p3-20.pdf [retrieved on Jan. 28, 2013].

Reiersen et al .: "The engineering design of TPX",15th I EEE/NPSS Symposium . Fusion Engineering, Oct. 11-15, 1993, Hyannis, MA, USA 15th IEEE/NPSS Symposium . Fusion Engineering (Cat. No.93CH3348-0), vol. 1, 1994, pp. 387-392, XP002691322, Retrieved from the Internet: URL:http://ieeexplore.ieee.org/stamp/stampjsptp=&arnumber=518356 [retrieved on Jan. 30, 2013].

Nagayama Y et al : "Proposal of steady state superconducting spherical Tokamak experiment" ,Denki Gakkai Ronbu Nshi. A, Kiso, Zairyo, Kyotsu Bumonshi Transactions of the Institute of Electrical Engineers of Japan. A, Denki Gakkai , Tokyo, J P, vol. 125, No. 11, Jan. 1, 2005 (Jan. 1, 2005) , pp. 964-965, XP008159727.

* cited by examiner

EFFICIENT COMPACT FUSION REACTOR

TECHNICAL FIELD

The present application relates to a compact fusion reactor operated at high toroidal field. In particular, though not exclusively, the invention relates to a spherical tokamak reactor suitable for use as an energy source or as a highly efficient neutron source

BACKGROUND

The challenge of producing fusion power is hugely complex. Many alternative devices apart from tokamaks have been proposed, though none have yet produced any results comparable with the best tokamaks currently operating such as JET.

World fusion research has entered a new phase after the beginning of the construction of ITER, the largest and most expensive (c15bn Euros) tokamak ever built. The successful route to a commercial fusion reactor demands long pulse, stable operation combined with the high efficiency required to make electricity production economic. These three conditions are especially difficult to achieve simultaneously, and the planned programme will require many years of experimental research on ITER and other fusion facilities, as well as theoretical and technological research. It is widely anticipated that a commercial fusion reactor developed through this route will not be built before 2050.

To obtain the fusion reactions required for economic power generation (i.e. much more power out than power in), the conventional tokamak has to be huge (as exemplified by ITER) so that the energy confinement time (which is roughly proportional to plasma volume) can be large enough so that the plasma can be hot enough for thermal fusion to occur.

SUMMARY

In accordance with a first aspect of the present invention there is provided a compact nuclear fusion reactor for use as an energy source or a highly efficient neutron source.

The reactor comprises a toroidal plasma chamber and a plasma confinement system arranged to generate a magnetic field for confining a plasma in the plasma chamber. The plasma confinement system is configured so that a major radius of the confined plasma is 1.5 m or less, preferably 1.0 m or less, more preferably 0.5 m or less. The reactor may be a spherical tokamak.

The plasma confinement system includes high temperature superconductor (HTS) coils capable of generating a toroidal magnetic field measured at the major radius of 3 T or more, preferably 5 T or more, preferably 10 T or more, more preferably 15 T or more. The HTS coils may be cooled in use to 77 K, or optionally to 30 K or less or even 4 K or less.

Previous designs for small fusion devices usually have a problem with wall loading—i.e. the neutron flux or dispersion of plasma heat through the walls of the plasma chamber. The optional use of a low power input to the plasma of 10 MW or less, preferably 6 MW or less, more preferably 3 MW, more preferably 1 MW or less, enables the device to be viable with existing materials and technology.

The power output from such a reactor can be at least 1 MW even with conventional copper magnets. When HTS toroidal field magnets are used it will be possible to operate the reactor at considerably higher toroidal field, with large increases in fusion power output.

Neutron production may be enhanced by directing one or more neutral beams into the plasma. The neutral beam or beams may have an energy of less than 200 keV, preferably less than 130 keV, more preferably less than 80 keV, more preferably less than 40 keV. Multiple neutral beams may be directed into the plasma from directions selected to optimise fusion reactions between particles in the beams and the thermal plasma, and may include colliding beams.

In one embodiment, the plasma is maintainable in a steady state for more than 10 seconds, preferably more than 100 seconds, more preferably more than 1000 seconds, more preferably more than 10000 seconds. Indeed, the plasma may be maintainable in a steady state continuously up to a few years. This dramatically increases the usefulness of the neutron or energy production, since the total number of neutrons and amount of energy emitted increases with long pulses. In order to achieve such long pulses, the plasma current may be driven without induction for example by using neutral beams or RF current drive. RF current drive includes any electromagnetic wave technique to drive the current including Electron Bernstein Wave, Lower Hybrid and Electron Cyclotron Resonance and any combination thereof. Lower energy neutral beams can be more efficient (per unit energy input) at transferring momentum to drive the current. The use of HTS magnets helps to maintain the plasma in a steady state because, being a superconductor, there is no heating effect from resistance in the magnet and the current supplies for HTS magnets are more stable than power supplies for resistive magnets.

The plasma may be initiated using merging-compression, or magnetic pumping whereby an oscillating current produces plasma rings to augment the plasma current, or activation of one or more solenoids (which may be retractable) located in a central core of the toroidal chamber, and/or RF current initiation by a gyrotron or other suitable high frequency generator. The plasma current may be ramped up using activation of the solenoids, RF current drive, and/or heating the plasma so that a rapid increase in poloidal field necessary to contain the plasma as it grows inputs almost sufficient flux to ramp-up the plasma current to a desired working value. If retractable solenoids are used they may optionally be pre-cooled high temperature superconducting solenoids. The plasma current may be maintained using RF current drive and/or Neutral Beam injection.

The neutral beam(s) and/or plasma may include tritium to enhance neutron production. Tritium is expensive and radioactive, so it may be preferable to operate the reactor using deuterium only. Some neutrons will still be produced by D-D fusion reaction (it is normally assumed that D-D fusion will produce approximately $\frac{1}{80}$ as many as produced by D-T fusion under the same conditions of toroidal field, plasma current and plasma heating). However D-D fusion can be important for testing of reactors prior to the use of tritium and in circumstances where the use of tritium is undesirable, eg for reasons of cost, complexity, safety, regulation or availability.

There are certain circumstances where surprisingly high neutron fluxes can be achieved with D-D fusion. This can be achieved by increasing the toroidal field, by judicious use of neutral beam injection and by optimising the methods of plasma heating, and/or by application of ICRH (Ion Cyclotron Resonance Heating) which has been shown to increase neutron production more than tenfold [4].

Shielding may be provided around the central column in order to reduce or eliminate damage from neutrons. The HTS manufactured material may be configured to provide enhanced resistance to neutron damage, for example by increasing the thickness of the HTS layer within the HTS manufactured material.

The HTS manufactured material may be configured to provide an increased current density, for example by reducing the thickness of the non-HTS layers or increasing the thickness of the HTS layers within the HTS manufactured material, in order to allow more space for shielding.

The central column may comprise beryllium, aluminium or another non-HTS material that will maintain acceptable levels of structural integrity and conductivity despite the neutron flux. The beryllium, aluminium or other non-HTS material is optionally cryogenically cooled to reduce its resistance and is optionally joined to HTS material forming the remainder of the toroidal magnet apart from the central column.

The inner part of the central column may be made of HTS and the outer part made of beryllium, aluminium or another non-HTS material that provides shielding against damage to the HTS from neutrons. The beryllium, aluminium or other non-HTS material is optionally cryogenically cooled to reduce its resistance and is optionally joined to HTS material forming the remainder of the toroidal magnet apart from the central column. The HTS material may be configured to provide enhanced resistance to neutron damage and/or enhanced current density.

The neutrons emitted by the reactor may be used, inter alia, for generation of electricity, production of heat, formation of isotopes for medical and other use, cancer therapy, production of hydrogen (for example by high temperature electrolysis), treatment of nuclear waste, manufacture of tritium by neutron bombardment of lithium, breeding of nuclear fission fuel, neutron spectroscopy, testing of materials and components, and/or scientific research.

In conventional fusion reactors, $\alpha$-particles generated in the plasma are retained. Although the invention described here is much smaller than a conventional fusion reactor, the $\alpha$-particles will still be confined because of the high field, and will give a significant contribution to the plasma heating.

While the reactor is running, there should optionally be no solenoid in the centre of the torus, since it could be damaged by the high neutron fluence.

A feature of the present invention is that High Temperature Superconductor (HTS) is used in the main toroidal field magnet (and optionally in the other magnets), enabling high fields to be obtained at low operational cost in a compact ST. The combination of high field, small size and low aspect ratio (which provides improved stability and improved energy confinement) enables fusion energy to be realisable on a much smaller scale than in previous designs.

The HTS cryostat can be designed with or without liquid cryogens and the cryogens could be a range of molecules or compounds including He, $H_2$, Ne or $N_2$ depending on the temperature and cooling power required. The cryostat can also be designed to add structural strength and rigidity to the tokamak and the toroidal field coils.

The HTS can be manufactured from a range of materials including YBCO or (Re)BCO (where Re is a rare earth element) in the form of tape or wire with a range of substrates, stabilizers, buffers and overlayers in order to give the structural properties and engineering current density required.

The fusion reactor may include divertor plates optimised to reduce the load per unit area on the walls of the plasma chamber, and/or divertor coils configured to direct an exhaust plume of the plasma and expand a footprint of said exhaust plume to large radius and/or sweep the contact region over the exhaust area. One or more of the divertors may be coated with liquid lithium. The walls of the vacuum chamber may also be coated with liquid lithium.

The reactor may also comprise a multiplier blanket configured to increase the flux of emitted neutrons (at the expense of individual neutron energy). Reflector blankets may be provided to direct neutrons out of the reactor in such a way as to produce local increases in flux density and/or to protect poloidal coils and other tokamak components from extensive neutron irradiation.

The reactor may also comprise a sub-critical blanket of fissile or fertile (eg thorium) material forming a hybrid fusion-fission reactor. In this arrangement the copious quantities of neutrons produced by fusion will start and sustain a fission reaction and/or convert fertile isotopes to fissile isotopes. This arrangement can be use to breed new nuclear fuel, destroy nuclear waste and/or generate energy.

The invention also provides a power station comprising a plurality of fusion reactors as described above.

In accordance with another aspect of the present invention there is provided a method of generating neutrons or energy by operating a nuclear fusion reactor comprising a toroidal plasma chamber. The method comprises initiating a plasma in the plasma chamber, generating a magnetic field with a toroidal component of 3 T or more, preferably of 5 T or more, preferably 10 T or more, more preferably 15 T or more to confine the plasma in the plasma chamber, the plasma having a major radius of 1.5 m or less, and emitting neutrons and other energetic particles.

BRIEF DESCRIPTION OF THE DRAWINGS

Some preferred embodiments of the invention will now be described by way of example only and with reference to the accompanying drawings, in which.

DETAILED DESCRIPTION

Figure 1:
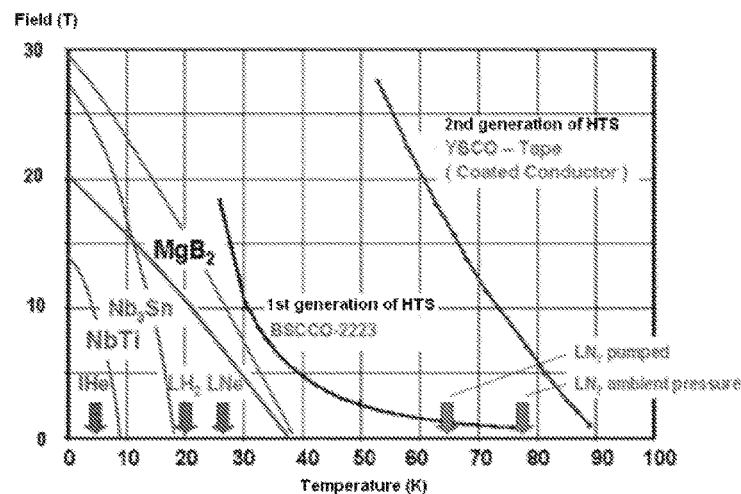
FIG. 1 shows a comparison of Low Temperature Superconductor (LTS) (left side) with 1st and 2nd generation HTS. The HTS material offers similar performance in a given magnetic field but at higher and more convenient temperatures; however if cooled to low temperatures (e.g. the 4K used for LTS) it can carry substantially higher current than LTS.

The present application is based on a very compact form of the tokamak, and employs a range of innovative features, including use of High Temperature Superconducting magnets. The 'Efficient Compact Fusion Reactor' (ECFR) is intended to provide a compact fusion power plant.

Fusion neutrons are produced when a deuterium-tritium (D-T) or deuterium-deuterium (D-D) plasma becomes very hot so that the nuclei fuse together, releasing energetic neutrons. To date, the most promising way of achieving this is to use a tokamak; in the conventional tokamak approach to fusion (as embodied by ITER), the plasma needs to have high confinement time, high temperature, and high density to optimise this process.

A tokamak features a combination of strong toroidal magnetic field $B_T$, high plasma current $I_p$ and usually a large plasma volume and significant auxiliary heating, to provide a hot stable plasma so that fusion can occur. The auxiliary heating (for example via tens of megawatts of neutral beam injection of high energy H, D or T) is necessary to increase the temperature to the sufficiently high values required for nuclear fusion to occur, and/or to maintain the plasma current.

The problem is that, because of the large size, large magnetic fields, and high plasma currents generally required, build costs and running costs are high and the engineering has to be robust to cope with the large stored energies present, both in the magnet systems and in the plasma, which has a habit of 'disrupting'—mega-ampere currents reducing to zero in a few thousandths of a second in a violent instability.

The situation can be improved by contracting the donut-shaped torus of a conventional tokamak to its limit, having the appearance of a cored apple—the 'spherical' tokamak (ST). The first realisation of this concept at Culham demonstrated a huge increase in efficiency—the magnetic field required to contain a hot plasma can be reduced by a factor of 10. In addition, plasma stability is improved, and build costs reduced.

A drawback of the ST is that the limited space in the central column prohibits installation of the substantial shielding necessary to protect the central windings in a neutron environment—so conventional toroidal field windings, and conventional central solenoids (used to induce and maintain the plasma currents) are not practical. Although power plants based on the ST have been designed (using solid copper centre posts with limited shielding, the post being changed every year or so when damaged by neutrons), these have high energy dissipation in the centre column due to the relatively high resistivity of warm copper, requiring a large device for electricity production to become economical.

An important factor is the strength of the toroidal magnetic field, $B_T$. Fusion power from thermal fusion in a tokamak is proportional to the fourth power of $B_T$ and so tokamaks are designed to use the maximum possible $B_T$ consistent with the significant stresses this imposes, and the significant costs of electricity required to power these magnets. To minimize these costs, long-pulse modern devices such as ITER feature LTS magnets cooled by liquid helium.

The present limit of the high-field approach is exemplified by the medium-sized IGNITOR project, now under development as a joint Russian-Italian project: IGNITOR is predicted to achieve short pulse ignition without need of extensive auxiliary heating, by virtue of its very high field $B_T$, ~13 Tesla at the plasma major radius (1.43 m) and ~20 T at the edge of the centre stack, obtained by conventional copper magnets with a steel support structure.

A drawback of the ST approach is that due to the reduced space in the centre column the toroidal field magnet therein is of limited size and so only relatively low toroidal fields of less than 1 Tesla have been achieved in STs to date. This problem is overcome in ECFR by use of High Temperature Superconducting magnets.

A smaller scale approach to fusion is to use the effect first suggested by Jassby [1] whereby injection of a high energy neutral beam into a small, merely 'warm', plasma can also produce significant fusion power. This effect combined with an ST, is the basis of our design for a 'Super Compact Neutron Source' (SCFNS) which has $B_T$=1.5 Tesla [2].

The power ($P_{fus}$) produced by SCFNS operating with D-T fusion is estimated at 1-2 MW, whereas input power ($P_{NBI}$) is ~6 MW of NBI; hence Q ($P_{fus}/P_{NBI}$) ~0.25, although $Q_{eng}$ ($P_{fus}/P_{total}$) is ~0.05 since to create 6 MW of NBI requires ~18 MW of electricity; and about a further 10 MW is lost in dissipation in the copper magnets. Production of net electrical power from fusion requires $Q_{eng}$>1. Nonetheless SCFNS produces significant fusion power for a small device, and the 14 MeV neutrons can have many valuable applications that compensate for the low efficiency of conversion of electrical power input to fusion power output.

Until now it has been thought that this smaller scale approach could not lead to an economic fusion energy power plant, as the input neutral beam injection (NBI) power is relatively large and the magnetic fields are not sufficient to contain the hot, charged alpha particles produced by fusion reactions within the plasma, which therefore loses the self-heating they could provide, and which is a key feature of conventional tokamak designs aimed at fusion power production. However recent advances in technology may enable these small STs to achieve high magnetic field, as described below.

High Temperature Superconductors

Recent advances in high temperature superconductors (HTS) have far-reaching consequences for fusion. Whereas conventional low temperature superconductor (LTS) magnets use temperatures in the liquid helium range (~4K), HTS can give similar results at the more convenient and easier to achieve liquid nitrogen temperature of 77K or even higher as shown in FIG. 1.

Figure 2:
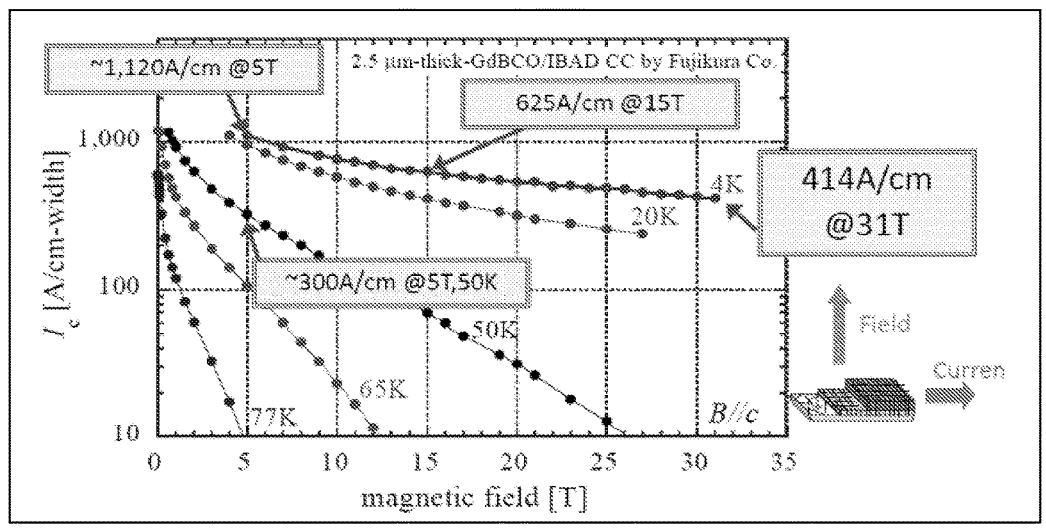
FIG. 2 shows the critical current as a function of magnetic field for an HTS sample at different temperatures.

But the advantages of HTS far exceed cost and convenience. As can be seen from FIG. 2, if HTS is actually operated at lower temperatures than 77K, the current-carrying ability is greatly increased (seen by moving vertically in FIG. 2 at any given applied field), and the conductor can operate in much higher fields (seen by moving horizontally in FIG. 2). Indeed, Oxford Instruments have recently demonstrated an HTS magnet producing nearly 23 T, exceeding the 20 T maximum achieved by LTS (actually done by inserting an HTS core into an LTS outer).

The combination of higher maximum field, increased current-carrying capability and reduced complexity of cooling means that very high toroidal field HTS magnets may be possible in the limited space of a Spherical Tokamak core. For example, if 30 T is feasible at the edge of the centre column (as suggested from FIG. 2), this would give 12 T at the major radius of an ST of aspect ratio 1.66 such as SCFNS. Fusion power in a beam-driven device such as SCFNS has been observed to be approximately proportional to $B_T$ cubed [3]. This implies that by increasing $B_T$ from 1.5 T for the existing SCFNS design to 12 T for the high field version described here, the fusion power would be increased approximately by 12/1.5 cubed, i.e. by 512; so $Q_{fus}$~128, $Q_{eng}$~38; and all in a small device! An additional benefit is that at these high fields, the charged alpha particles produced during the fusion reaction will remain in the plasma, providing significant self-heating and further increasing the efficiency of the reactor. Work by Jassby [1] showed that there is a fundamental limit to the efficiency of idealised beam-plasma fusion at around $Q_{fus}$~3 so while this would still allow a highly efficient neutron source from a small device, it is not a viable approach for energy production. However at the high fields now envisaged we obtain higher confinement, higher plasma temperatures and hence a combination of beam plasma fusion and thermal fusion, possibly purely thermal fusion without need for neutral beam heating.

The maximum achievable thermal fusion power is well known to be proportional to the $4^{th}$ power of toroidal field [5]. In fact it is proportional to $\beta^2 B_T^4 V$ where $\beta$ is the normalized plasma pressure and V is the volume. The $\beta$ limit is 4 to 5 times higher in a spherical tokamak than in a conventional low aspect ratio tokamak, so if $B_T$ can be as high as 12 T or more, and high plasma pressures can be obtained, then high thermal fusion power is possible even from a small spherical tokamak. For example, ITER is expected to produce 500 MW of fusion power with a toroidal field of 5.5 T. A spherical tokamak with twice the toroidal field and 4 times higher $\beta$ should be able to produce the same power in 1/256 of the volume.

High Temperature Superconducting technology continues to advance rapidly. The first generation HTS material, BSCCO, was rapidly overtaken by YBCO. As well as the discovery of new HTS materials with fundamentally higher critical fields and critical currents, the engineering performance of existing materials such as YBCO (or, more generally (Re)BCO where Re is a rare earth atom) is rapidly being improved with the result that magnets made from HTS can achieve increasingly high fields from increasingly small conductors. In the present specification, it will be understood that HTS materials include any material which has superconducting properties at temperatures above about 30 K in a low magnetic field.

The performance of HTS under intense high energy neutron bombardment is not yet known, however there are concerns that it will need more than 10 cm of shielding in order to remain effective for months or years of operation. This amount of shielding may be too large to accommodate around the central column of a small spherical tokamak. Several alternative means may be utilized to allow a high current to pass through the central column.

Figure 5:
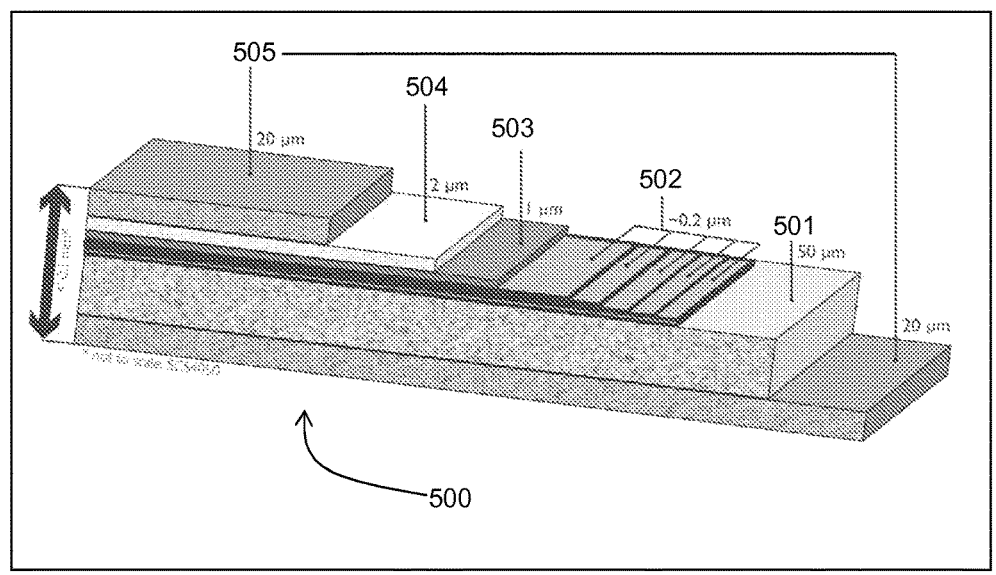
FIG. 5 shows the structure of one example of HTS material.

FIG. 5 is a schematic illustration of the components of standard HTS tape 500. Such tape 500 is generally approximately 100 microns thick, and includes an electropolished hasteloy substrate 501 approximately 50 microns thick, on which is deposited by IBAD or magnetron sputtering a series of buffer stack layers 502, each approximately 0.2 microns thick. An epitaxial (RE)BCO-HTS layer 503 (deposited by MOCVD) overlays the buffer layer, and is typically 1 micron thick. A two micron silver layer 504 is deposited on the HTS layer by sputtering, and 20 micron copper stabilizer layers 505 are electroplated onto both sides of the tape. In order to increase the current in the tape, the thickness of the HTS layer may be increased from around 1 micron to between 4 and 20 microns. This increases the current that can be carried by a factor of between 2 and 5 [20] and increases the neutron tolerance by a factor of between 4 and 20. As mentioned above, the overall tape thickness is normally 100 microns, so if this is the only change made, the increase in tape thickness will be less than 20%.

Another approach is to reduce the thickness of the copper 505 and hasteloy 501 layers (or other conducting/supporting non-HTS layers in the tape). Halving the thickness of these non-HTS layers approximately doubles the current density in the tape, allowing more space for shielding.

A third approach is to use a cryogenically cooled beryllium or aluminium central post in the spherical tokamak instead of HTS as shown in FIG. 6 option B. There would be undesirable resistive losses in the beryllium or aluminium, but these can be minimized by cooling, ideally to 30K or lower and by connecting the beryllium or aluminium central post to HTS outer arms of the toroidal field coils. Beryllium or aluminium is chosen because it has low resistivity at temperatures of 30K or lower and because it is resistant to damage from high energy neutrons. Other elements or materials with these properties, or similar properties, could also be used.

A fourth means is to use a combination of an outer cryogenically cooled beryllium or aluminium central post with an inner part made of HTS as also shown in FIG. 6 option C. The beryllium or aluminium outer provides some shielding of the HTS. Cooling, ideally to 30K or lower, and connecting the beryllium or aluminium/HTS central post to HTS outer arms of the toroidal field coils is still necessary to minimize resistive losses.

A combination of these techniques, for example the first, second and fourth means, could be used.

For an efficient ST fusion neutron or energy source to be practical it is desirable to solve the following problems:
  Initiating the plasma current without a conventional central solenoid.
  Ramping up the plasma current to the required value.
  Maintaining the plasma current for a long time with low power input.
  Heating the plasma to produce neutrons at low power input.
  Ensuring that the heat load from the plasma on the divertor regions is tolerable.
  Designing a structure capable of protecting itself against neutron damage, whilst producing a fluence of neutrons for energy production or for scientific and other applications.

Several options have been considered for an efficient compact fusion reactor operating at high toroidal field, including:
  a. A tokamak with copper or superconducting magnets and an aspect ratio A=3-4 (A=R/a—ratio of large radius R of the torus to a small radius a);
  b. A tokamak with superconducting magnets and A=2;
  c. A compact spherical tokamak with copper magnets and A=1.5-1.8;
  d. A compact spherical tokamak with LTS magnets and A=1.5-1.8;
  e. A compact spherical tokamak with HTS magnets and A=1.5-1.8;
  f. A compact spherical tokamak with a combination of beryllium or aluminium and HTS magnets and A=1.5-1.8;

Options (a) and (b) are well known, but they can only achieve high efficiency if they are large, comparable in size to ITER. Neutral beam injection is important for current drive in such devices, but does not make much contribution to neutron or energy production.

Option (c) is limited by the current carrying capacity and strength of copper. It is difficult to achieve a high field on a small device with low aspect ratio because of the limited space in the centre of the tokamak. In addition the power and cooling requirements for high currents through copper are very substantial and this effectively prevents long pulse operation.

Option (d) is viable and the performance of LTS (materials such as $MgB_2$, $Nb_3Sn$ and NbTi) could be satisfactory although the design of a low temperature cryostat to allow these materials to achieve high field is challenging.

Option (e) is better than option (d) because the performance of HTS is better that LTS. HTS can sustain a higher current density at a higher magnetic field and higher temperature than LTS. This means the size of the HTS conductor and surrounding cryostat can be smaller than for LTS. In turn this means that the whole device can be smaller and cheaper while operating at higher magnetic field and hence being more efficient.

Option (f) may be better than option (e) as the beryllium or aluminium central post, or partial central post, could overcome the problems of damage to the HTS by fast neutrons.

The present document focuses on options (e) and (f), an Efficient Compact Fusion Reactor (ECFR) based on a compact spherical tokamak with HTS toroidal field coils, or with a combination of beryllium or aluminium and HTS toroidal field coils. This provides the opportunity to operate small spherical tokamak reactors at relatively high toroidal fields of 3 T and above, potentially providing huge increases in the fusion power produced because, in the case of thermal fusion, fusion power can increase with the fourth power of the toroidal field. In addition, the energy loss in dissipation in the magnets is greatly reduced if HTS is used.

Previous Studies of ST-Based Fusion Devices

Before describing the device in detail, it is helpful to consider previous studies of fusion devices based on spherical tokamaks.

Stambaugh et al [5] in 'The Spherical Tokamak Path to Fusion Power' described a family of Spherical Tokamaks (STs) including a Pilot Plant with major radius of R ~0.7 m (plasma current Ip ~10 MA, central toroidal field $B_{T_o}$~2.8 T) which have significant output (400 MW) at an optimistically high H-factor (increase in energy confinement over scaling law for conventional tokamaks) ~7 and $\beta_T$ (measure of efficiency: the ratio of plasma pressure contained to magnetic field pressure required) 62% and a wall loading of 8 MW/m2 (wall assumed to be at radius Ro+2a) and which are designed to produce electricity economically.

Hender et al [6] considered a Component Test Facility (CTF) based on a similarly modest sized ST (R ~0.7 m, Ip ~10.3 MA, BTo ~3 T, fusion output ~40 MW at a modest H-factor ~1.3, $\beta_N$~2.6 and wall load (at Ro+2a) of ~0.75 MW/m2) designed to produce sufficient neutron fluence to test fusion reactor components.

Wilson et al [7] extended the work of Hender et al to propose a CTF again of A ~1.6, designed to consume <1 kg of tritium per year and specifically to aid the fast-track approach to fusion power by testing components and materials. Their device has R ~0.75 m, Ip ~8 MA, BTo ~2.8, H ~1.3, PNBI ~60 MW, and yields Pfus ~50 MW of which about 25% arises from beam-plasma interactions (discussed further below).

Voss et al [8] developed the Wilson design, increasing the size slightly to R=0.85 m, a=0.55 m, with a slight decrease in current and field to 6.5 MA and 2.5 T, again assuming H=1.3, with PNBI=44 MW and Pfus=35 MW.

Dnestrovkij et al [9] provided a DINA code simulation of the Wilson CTF, and find by using a different mix of NBI energies (6 MW at 40 keV and 44 MW at 150 keV) they can provide current ramp-up and, aided by a larger tritium fraction of 70% (cf 50%) obtain the same fusion output (50 MW) but at considerably lower plasma current (5.5 MA cf 8 MA). Although tritium is scarce and expensive, the option of using a larger tritium fraction to obtain the same neutron output but at lower plasma pressure (and hence improved plasma stability) is attractive.

Peng et al [10] proposed a larger CTF with R=1.2 m, A=1.5, k=3.07, Bt=1.1-2.2 T, Ip=3.4-8.2 MA, heating power 15-31 MW, bootstrap (self-driven current) fraction ~0.5, Q (ratio of fusion power out to input power)=0.5-2.5, Pfus=7.5-75 MW. This CTF also has an option of tritium breeding.

Galvao et al [12] studied a 'Multi functional Compact Tokamak Reactor Concept' a device of major radius Ro=1.2 (some 50% larger than MAST and NSTX), with A=1.6, Ip=5 MA, BTo=3.5 T, and obtained a fusion gain (Q) ~1 for a range of auxiliary heating powers from 5 MW to 40 MW. Interestingly, at lower powers the maximum Q ~1 gain occurs at ever lower densities, whereas bootstrap current increases almost linearly with density—so the higher performance options have the advantage of largest self-driven current. However this study did not consider the additional neutron production provided by beam-plasma interactions.

More recently, Kotchenreuther et al [11] proposed a larger Fusion Neutron Source with 100 MW fusion output (Ro=1.35 m, aspect ratio 1.8, BTo=3.1 T, Ip=10-14 MA) using their 'Super X' divertor to solve the critical divertor thermal load problem. Their device is designed for use either as a CTF, or as the basis of a fusion-fission hybrid.

All the above studies employ NBI for current drive and heating, in conjunction with α-particle heating (note α-particles have low prompt losses at the high plasma currents employed in the above studies). They use well-understood technology (e.g. copper windings), and aspect ratios 1.4~1.6 (at which sufficient tritium can be bred without need of a centre-column blanket).

Recently, smaller, lower power compact fusion neutron sources have been proposed, with modest fusion outputs of 1-2 MW. Their requirements are significantly less demanding than those in the above studies, especially the Stambaugh et al study which requires long-pulse operation close to stability limits and at high wall-loading to ensure cost-effective electricity production. Hender and Wilson require high neutron flux for long periods to provide sufficient component testing, and operate at high plasma current. In these recent proposals, demands on physics limits and on engineering are much reduced, however a useful fusion power should be obtainable.

Two recent studies are particularly relevant:

Kuteev et al [13] specifically addressed the need for a small facility developing up to 10 MW of fusion power whilst requiring total auxiliary heating and current drive power <15 MW and total power consumption <30 MW. They re-evaluated the smallest (Ro ~0.5 m) member of the Stambaugh range but under extremely reduced conditions: Ip ~3 MA, BTo ~1.35 T with a neutron fluence of ~3×10$^{17}$ n/s corresponding to a fusion power of ~1 MW and a neutron load 0.1 MW/m$^2$. Modelling shows that neutron production is more than doubled by the beam-on-plasma effect. Importantly for a first pilot device, the build cost was estimated at less than £200M.

Thus rather than operating at high plasma current, it may be possible to employ significant NBI auxiliary heating and enjoy significant neutron production from the NBI beam-on-plasma interactions noted by Jassby [1]. This effect occurs when injected beams slow down in a thermal tokamak plasma, and is effective in the ST plasmas considered here.

Sykes et al [2] develop the beam-plasma fusion concept and propose a small spherical tokamak (SCFNS=Super Compact FNS) with fusion power (dominated by beam-plasma fusion) of 1-2 MW. SCFNS has parameters R ~0.5 m, with Ip=1.5 MA (half that of the Kuteev design), and BT=1.5 T. A neutral beam power of only ~6 MW is sufficient to both maintain the plasma current, and to provide the fusion power; this low input power reduces the wall and divertor loadings to tolerable values, so that techniques developed for ITER can be utilised.

The spherical tokamak represents a low aspect ratio version of a conventional tokamak and is a crucial component of the present invention.

The concept of a spherical tokamak (ST) was first introduced by Jassby [14] and later by Peng [15]. At the same time, a small low-aspect ratio tokamak GUTTA was constructed and operated at Ioffe Institute, Russia, confirming some of unique features of the ST concept. The first demonstration of the main advantages of a spherical tokamak (i.e. high beta, high natural elongation, improved stability and enhanced confinement—H-mode) was on the START device [16] which was operating at Culham Laboratory 1990-1998. START was a small tokamak but achieved normalised plasma pressures $\beta_t$~40% (which is still a record for tokamaks). In the ST the aspect ratio A of the plasma column is substantially reduced with respect to conventional tokamak aspect ratio range (A=3-4), giving significant improvements in plasma stability. The combination of simple construction, excellent results and high reliability confirmed on more than 15 small and medium sized STs operated during the last decade produce a strong motivation for an ST as the next step in fusion research, and the high performance and small size makes the ST economical both in build cost and in tritium consumption (if D-T operation is desired).

Figure 3:
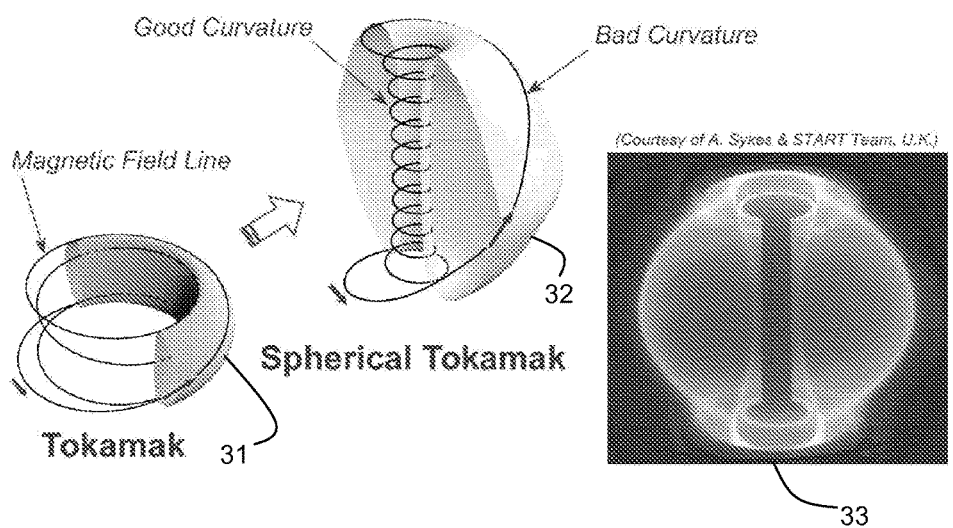
FIG. 3 illustrates the magnetic field line behaviour in conventional and spherical tokamaks.

FIG. 3 (courtesy of Y-K M Peng) illustrates an effect of aspect ratio reduction. The figure shows the peripheral magnetic field lines in a conventional tokamak 31 and in a spherical tokamak 32. In the conventional tokamak 31, magnetic field lines have comparable lengths in the region of a favourable curvature (inner, high field and stable region) and unfavourable curvature of magnetic field (outer unstable region). In the spherical tokamak 32 the field line path in the inner, stable region is significantly higher than in the outer, unstable region and the field line is generally wrapped onto the central core of the plasma, where the toroidal magnetic field is highest. As the particle motion in a magnetic trap is bound to the field lines, the most straightforward result of an aspect ratio decrease is an increase in the plasma column magneto-hydrodynamic (MHD) stability. This improved MHD stability permits either a significant increase in the plasma current, or a decrease in the toroidal magnetic field strength; this feature has been exploited in the successful ST experiments, notably START at Culham [16]. The figure shows the plasma 33 in the START tokamak, with sharp plasma edges, demonstrating the excellent confinement properties (H-mode) obtainable in an ST plasma.

To date, STs have produced good physics performance but so far they have low magnetic fields, low heating power and most of them are short pulse devices. The neutron flux is modest as tritium has not been used, and modelling shows that even if a D-T mix could be employed, neutron yield would be small, mainly because of the low toroidal field.

The proposed device Efficient Compact Fusion Reactor (ECFR) is the first ST to have high magnetic field, high availability, high neutron fluency, low running costs and the capability to produce net energy over extended periods of time.

Main Parameters of ECFR

The ECFR device is a long-pulse spherical tokamak with an elongated plasma, and a double-null divertor. The design objectives are to demonstrate routine steady-state operation in hydrogen (enabling optimisation and any necessary modifications to be made without problems of radioactivity), before proceeding to deuterium-deuterium (DD) and then, if desired, to a deuterium-tritium (DT) mix where considerable neutron fluence would result. The design incorporates optional features (notably shielding/neutron reflectors and a heavy water blanket) which allow control of the neutron output for test purposes.

Standard operation produces significant D-T fusion power for a burn length of longer than 1000 sec which is determined as a "quasi steady-state" for most engineering requirements. The injection of neutral beams of energy up to about 200 keV provides the main source of auxiliary power and can assist current drive. RF heating and current drive is also considered.

Start-Up and Ramp-Up

In existing tokamaks the plasma current is initiated by transformer action using a large central solenoid. It is planned to obtain start-up and ramp-up of the plasma current in ECFR without use of a large central solenoid because, in the final design, the large neutron fluence may prohibit its use, as there may be insufficient space for the extensive shielding required to protect the windings. In the present invention a wider range of techniques may be used.

A major advantage of the spherical tokamak is that the plasmas (having low aspect ratio and high elongation) have low inductance, and hence large plasma currents are readily obtained—the input of flux from the increasing vertical field necessary to restrain the plasma is also significant at low aspect ratio [17].

Experiments on MAST have demonstrated start-up using a 28 GHz 100 kW gyrotron (assisted by vertical field ramp) at an efficiency of 0.7 A/Watt [18]. A gyrotron fitted to ECFR could have power ~1 MW and is predicted to produce a start-up current of ~700 kA.

An alternative scheme is to use a small solenoid (or pair of upper/lower solenoids) made using mineral insulation with a small shielding (or designed to be retracted before D-T operation begins); it is expected that such a coil would have approximately 25% of the volt-secs output as an equivalent solenoid as used on MAST or NSTX. Initial currents of order 0.5 MA are expected. The combination of both schemes would be especially efficient.

A novel development of the 'retractable solenoid' concept is to use a solenoid wound from HTS, to cool it in a cylinder of liquid nitrogen outside the tokamak, insert it into the centre tube whilst still superconducting, pass the current to produce the initial plasma, then retract the solenoid before D-T operation. Advantages of using HTS include lower power supply requirements, and the high stresses that can be tolerated by the supported HTS winding.

This initial plasma current will be an adequate target for the lower energy NBI beams, and the heating and current drive they produce will provide current ramp up to the working level.

Heating and Current Drive

As previously discussed, it is desirable to obtain a significant fluence of neutrons at minimum auxiliary heating and minimum current drive, in order to minimise build costs, running costs, and to keep divertor heat loads at tolerable levels.

Recent energy confinement scalings, derived from recent results on both MAST at CCFE and NSTX at Princeton suggest that energy confinement in an ST has a stronger dependence on magnetic field, and a lower dependence on plasma current, than for conventional tokamaks, and hence is improved for the high field of this design.

Various methods of heating (and current drive) including NBI and a range of radio-frequency (RF) methods may be appropriate. NBI is the most widely used scheme and has the advantages of easy injection into the plasma, and less sensitivity to plasma parameters than most RF methods.

NBI is also the most commonly used method of current drive. Its efficiency depends on many parameters—beam energy, angle of injection, density of plasma. Typically 1 MW of NBI may drive 0.1 MA of plasma current; and since NBI costs approx £3M per MW, this is a major cost. A potentially helpful feature is the self-driven 'bootstrap' current, produced in a hot, high energy, plasma, which can account for one-half or more of the required current. However bootstrap current increases with density, whereas NBI current drive reduces at high density, so a careful optimisation is required.

Thermal Load on Divertors

Some of the energy pumped into a plasma either to heat it or produce current drive emerges along the scrape-off-layer (SOL) at the edge of the plasma, which is directed by divertor coils to localised divertor strike points. The power per unit area here is of critical concern in all fusion devices, and would not normally be acceptable in a small neutron or energy source. However in the present proposal the input power is greatly reduced (of order of a few MW, compared to tens of MW in other designs) so the divertor load is correspondingly reduced. Additional methods are used to reduce the load per unit area further, by a combination of strike-point sweeping; use of the 'natural divertor' feature observed on START; and use of divertor coils to direct the exhaust plume (as advocated by Peng & Hicks [19]); possibly to expand the footprint to large radius as in the 'super-X' divertor advocated by Kotschenreuther et al [11]. This latter normally requires large currents in the divertor control coils, as these have to be somewhat removed from the neutron source for protection: however this demand is made tractable here because of the modest plasma current required. Further benefit may be gained by use of a flow of liquid lithium over the target area which will also be used to pump gases from the vessel, for example in a closed lithium flow loop.

General Outline of this Device

Figure 4:
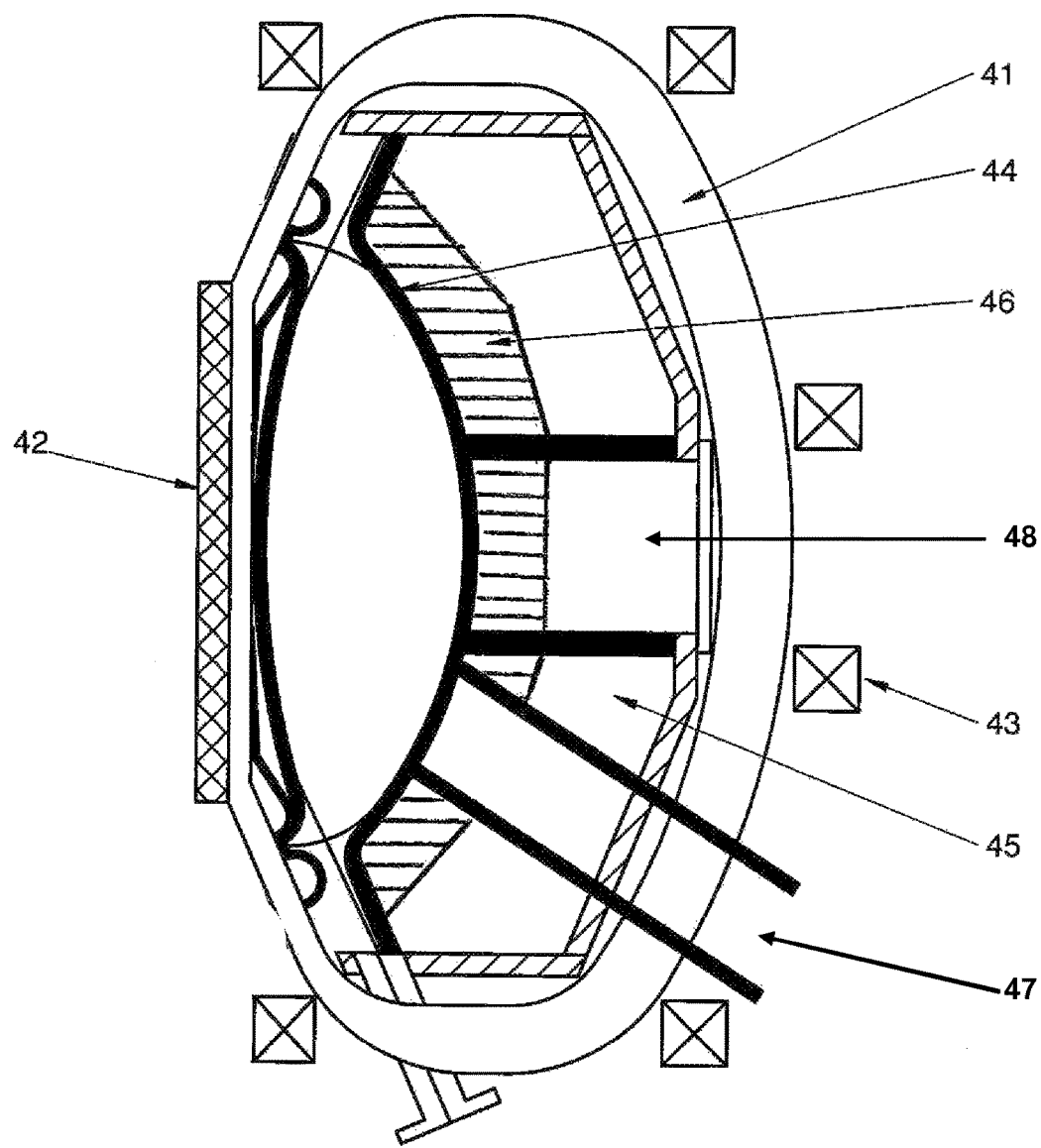
FIG. 4 is a half cross-section through a spherical tokamak with conventional copper magnets.

A cross section of a spherical tokamak with conventional copper magnets suitable for use as a neutron source is shown in FIG. 4. The major components of the tokamak are a toroidal field magnet (TF) 41, optional small central solenoid (CS) 42 and poloidal field (PF) coils 43 that magnetically confine, shape and control the plasma inside a toroidal vacuum vessel 44. The centring force acting on the D-shaped TF coils 41 is reacted by these coils by wedging in the vault formed by their straight sections. The outer parts of the TF coils 41 and external PF coils are optionally protected from neutron flux by a blanket (which may be $D_2O$) and shielding 45. The central part of TF coils, central solenoid and divertor coils are only protected by shielding.

The vacuum vessel 44 may be double-walled, comprising a honey-comb structure with plasma facing tiles, and directly supported via the lower ports and other structures. Integrated with the vessel are optional neutron reflectors 46 that could provide confinement of fast neutrons which would provide up to 10-fold multiplication of the neutron flux through ports to the outer blanket where neutrons either can be used for irradiation of targets or other fast neutral applications, or thermalised to low energy to provide a powerful source of slow neutrons. The reason for such assembly is to avoid interaction and capture of slow neutrons in the structures of the tokamak. The outer vessel optionally contains $D_2O$ with an option for future replacement by other types of blanket (Pb, salts, etc.) or inclusion of other elements for different tests and studies. The outer shielding will protect the TF and PF coils, and all other outer structures, from the neutron irradiation. The magnet system (TF, PF) is supported by gravity supports, one beneath each TF coil. Ports are provided for neutral beam injection 47 and for access 48.

Inside the outer vessel the internal components (and their cooling systems) also absorb radiated heat and neutrons from the plasma and partially protect the outer structures and magnet coils from excessive neutron radiation in addition to $D_2O$. The heat deposited in the internal components in the vessel is ejected to the environment by means of a cooling water system. Special arrangements are employed to bake and consequently clean the plasma-facing surfaces inside the vessel by releasing trapped impurities and fuel gas.

The tokamak fuelling system is designed to inject the fuelling gas or solid pellets of hydrogen, deuterium, and tritium, as well as impurities in gaseous or solid form. During plasma start-up, low-density gaseous fuel is introduced into the vacuum vessel chamber by the gas injection system. The plasma progresses from electron-cyclotron-heating and EBW assisted initiation, possibly in conjunction with flux from small retractable solenoid(s), and for a 'merging-compression' scheme (as used on START and MAST), to an elongated divertor configuration as the plasma current is ramped up. A major advantage of the ST concept is that the plasmas have low inductance, and hence large plasma currents are readily obtained if required—input of flux from the increasing vertical field necessary to restrain the plasma being significant [18]. Addition of a sequence of plasma rings generated by a simple internal large-radius conductor may also be employed to ramp up the current.

After the current flat top is reached, subsequent plasma fuelling (gas or pellets) together with additional heating leads to a D-T burn with a fusion power in the MW range. With non-inductive current drive from the heating systems, the burn duration is envisaged to be extended well above 1000 s and the system is designed for steady-state operations. The integrated plasma control is provided by the PF system, and the pumping, fuelling (H, D, T, and, if required, He and impurities such as $N_2$, Ne and Ar), and heating systems based on feedback from diagnostic sensors.

The pulse can be terminated by reducing the power of the auxiliary heating and current drive systems, followed by current ramp-down and plasma termination. The heating and current drive systems and the cooling systems are designed for long pulse operation, but the pulse duration may be determined by the development of hot spots on the plasma facing components and the rise of impurities in the plasma.

The approach outlined above enables the design of an Efficient Compact Fusion Reactor (ECFR) that is much smaller than previous designs of fusion reactors aimed at generating net power, having correspondingly lower construction and operational costs (volume from ⅕ to ⅟₁₅ of existing designs, magnetic field energy and tritium consumption 10-100 times lower). The ECFR is an ideal first device to evaluate previously untested areas such as steady-state operation, plasma control, tritium operation, etc whilst producing at least 1 MW of fusion neutrons ideal for scientific research, materials tests, production of isotopes for medical and other applications, etc. ECFR is capable of producing net energy over an extended length of time. As such it can be much more than a useful demonstration of fusion technology, it can be the first viable demonstration of a fusion power station.

This design is made possible by a novel combination of new and established techniques over a wide range covering plasma initiation; ramp-up of plasma current; key methods of enhancing neutron production at relatively low current, field and auxiliary heating; use of improved energy confinement; means of varying the neutron energy in a controllable and tunable manner; efficient means of producing steady-state operation; methods of handling the exhaust heat load; special methods of construction, featuring shielding and optional reflectors to both protect coil windings and control the neutron output; and the use of HTS to enable exceptionally high toroidal fields in a small spherical tokamak.

Figure 6A:
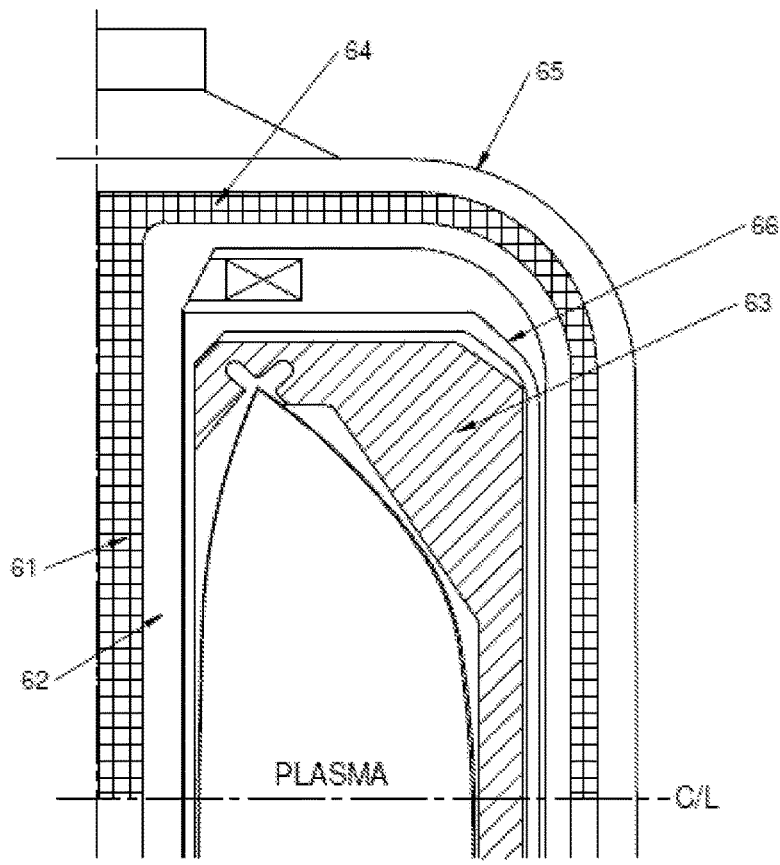
FIG. 6 shows a quarter cross section through a spherical tokamak with HTS toroidal field magnets with limited neutron shielding and different configurations of the central column to provide more resilience to neutron bombardment

A quarter cross section of a spherical tokamak with HTS magnets suitable for use as an energy or neutron source is shown in FIG. 6A. The important features of this tokamak in addition to the major components shown in FIG. 4 are a centrepost 61 that can be either HTS or beryllium or aluminium, thermal insulation and cooling channels 62 to allow the centrepost to be cooled, shielding 63 to prevent neutron damage to the outboard coil 64 made from HTS, a cryostat 65 to cool the HTS and a vacuum vessel 66 which can be inside or outside the shielding 63.

Figure 6B:
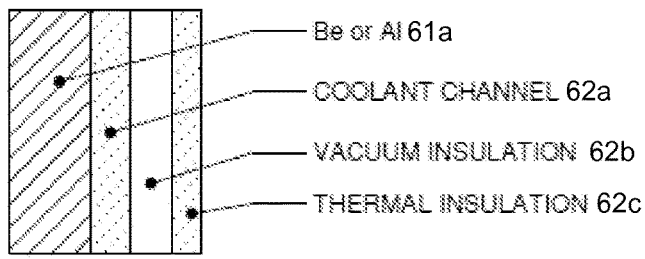
Figure 6C:
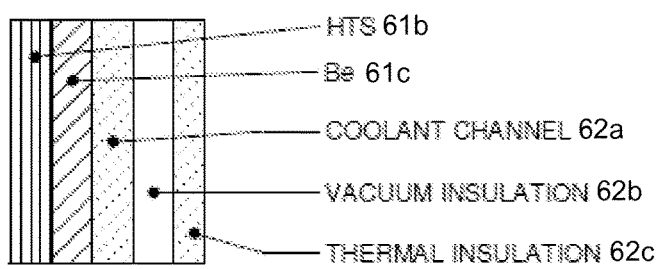

There are several options for the centrepost 61. One option includes HTS with or without neutron shielding. Another option is shown in FIG. 6B and includes an inner part 61a of beryllium, aluminium or another non-HTS material, a coolant channel 62a, vacuum insulation 62b and thermal insulation 62c. A further option is shown in FIG. 6C and is formed by a combination in which an inner part 61b is made of HTS and an outer part 61c is made of beryllium, aluminium or another non-HTS material that provides some shielding against damage to the HTS from neutrons. Additional neutron shielding can be added to each option, subject to the space constraints in a spherical tokamak.

Plasma initiation: methods include merging-compression; magnetic pumping whereby an oscillating current produces plasma rings which augment the plasma current; use of a retractable solenoid, or pair of such solenoids; RF current initiation by a gyrotron.

Current ramp-up: methods include retractable solenoid(s), which may be pre-cooled high temperature superconductor solenoids; RF current drive; and the efficient drive produced by heating the plasma so that the rapid increase in poloidal field necessary to contain the growing plasma inputs almost sufficient flux to ramp up the plasma current to the desired working value.

Enhanced neutron production: in a conventional fusion device nearly all neutron production arises from thermal fusion in the central highest temperature region of the plasma. In contrast, in the SCFNS super-compact neutron source, most neutron production is from interaction of one or more neutral beams with the plasma. In the proposed ECFR device, the high value of the toroidal field provides high plasma temperatures, and neutron output is a mix of thermal and beam-thermal fusion. New modelling shows that neutron production is further enhanced by the relatively long path of the NBI beam when directed at optimum angle through the highly-elongated plasma (a natural feature of an ST) and by optimising the tritium fraction. The tritium fraction may be optimised by the use of either deuterium or tritium neutral beams which will provide refueling as well as heating and current drive.

Variable neutron energy: in a conventional fusion device the neutron energy is fixed at 14 MeV for D-T fusion and 2.5 MeV for D-D fusion. In one version of the proposed device an antenna configured to induce ion cyclotron resonance heating (ICRH) would be mounted inside the toroidal chamber. This ICRH system could also be configured to increase the energy of the emitted neutrons by several MeV in a controllable and tunable manner.

Optimising neutron output from D-D fusion: while D-T fusion is the best way to achieve the highest neutron flux and energy for some applications, it may be more effective to avoid the problems associated with tritium (eg cost, complexity, safety, regulation or availability) and instead use ICRH to increase neutron energy and/or to heat a D-D plasma to increase neutron flux. This use of ICRH can be combined with higher toroidal field and higher plasma current to give a surprisingly high neutron output from D-D Fusion in a system that may be more cost effective than a D-T Fusion system producing the same neutron flux. Data from JET [4] shows that ICRH can increase the neutron yield by a factor of 14 for D-D fusion.

Favourable confinement scaling: recent research suggests that energy confinement in an ST has a stronger dependence on magnetic field, and a lower dependence on plasma current, than the ITER scalings derived for conventional tokamaks. This prediction is very promising for the high field, and relatively low plasma current, of ECFR.

Construction features: insulation of the low-voltage toroidal field coil segments can be by stainless steel which combines great strength and relatively high resistance; the TF system may be demountable, utilising high-duty versions of the feltmetal sliding joints developed by Voss at CCFE; the device itself could feature a combination of heavy-water tanks and layers of shielding/reflectors (eg of Be or Pb) to protect the PF coils and external TF coils from lower energy neutrons, and to direct the main stream of neutrons for research and processing tasks.

It is also possible to shoot positive ion beams directly into the plasma through iron tubes which shield out the magnetic field.

It will be appreciated that compact fusion reactors such as those described herein have a much larger surface area per unit plasma volume than bigger tokamaks. In general costs and implementation difficulty scale at least linearly with plasma volume, while energy output (which can be considered to be limited by acceptable damage levels) scales linearly with surface area. In addition, the costs of a "one (or few) of a kind" device are well known to be higher than the costs of "many of a kind" devices. It therefore seems likely that many smaller fusion reactors should be cheaper per unit net power output than one large fusion reactor.

It will be appreciated that variations from the above described embodiments may still fall within the scope of the invention.

REFERENCES

[1] Jassby D L 'Optimisation of Fusion Power Density in the Two Energy Component Tokamak Reactor' Nuclear Fusion 1975 Vol 15 p 453
[2] A. Sykes et al, 'Fusion for Neutrons—a realizable fusion neutron source', Proc of 24$^{th}$ IEEE Symposium on Fusion Engineering, Chicago 2011 Invited Paper SO2B-1
[3] M. Valovic et al, Nuclear Fusion 51 (2011) 073045
[4] C Hellesen et al, Nuclear Fusion 50 (2010) 022001
[5] R D Stambaugh et al, 'The Spherical Tokamak Path to Fusion Power', Fusion Technology Vol 33 P1 (1998)
[6] T C Hender et al, 'Spherical Tokamak Volume Neutron Source', Fusion Engineering and Design 45 (1990) p 265
[7] H R Wilson et al The Physics Basis of a Spherical Tokamak Component Test Facility Proc. 31$^{st}$ EPS Conf 2004
[8] G M Voss et al, 'Conceptual design of a Component Test Facility based on the Spherical Tokamak', FED 83 (2008) p 1648

[9] A Dnestrovskij et al, Plasma Devices and Operations, 15, 2007, p 1
[10] Y-K M Peng et al 2005 *Plasma Phys. Control. Fusion* 47 B263
[11] M. Kotschenreuther, P. Valanju, S. Mahajan, L. J. Zheng, L. D. Pearlstein, R. H. Bulmer, J. Canik and R. Maingi '*The super X divertor (SXD) and a compact fusion neutron source (CFNS)*' Nucl. Fusion 50 (2010) 035003 (8 pp)
[12] R M O Galvao et al, 'Physics and Engineering Basis of a Multi-functional Compact Tokamak Reactor Concept', paper FT/P3-20, IAEA conf 2008
[13] B V Kuteev et al, 'Plasma and Current Drive parameter options for a low-power Fusion Neutron Source' 23rd IEEE/NPSS Symposium on Fusion Engineering, 2009. SOFE 2009.
[14] D L Jassby, Comments Plasma Phys. Controlled Fusion, 3 (1978) 151
[15] Y-K. M. Peng and D. J. Strickler, Nucl. Fusion 26, 769 (1986).
[16] M Gryaznevich at all, Phys. Rev. Letters, 80, (1998) 3972
[17] O. Mitarai and Y. Takase, Plasma current ramp-up by the outer vertical field coils in a spherical tokamak reactor, Fusion Sci. Technol. 43 (2003),
[18] V. Shevchenko, Nuclear Fusion Vol 50 (2010) p 22004
[19] Y-K M Peng and J B Hicks, proceedings of the 16th Symposium on Fusion Technology, London, U.K., 3-7 Sep. 1990, Vol 2 p 1288
[20] V. Selvamanickam, "2G HTS Wire for High Magnetic Field Applications," HTS4Fusion Conductor Workshop, May 26-27, 2011, Karlsruhe, Germany.

The invention claimed is:

1. A compact nuclear fusion reactor comprising a spherical tokamak having a toroidal plasma chamber and a plasma confinement system arranged to generate a magnetic field for confining a plasma in the plasma chamber, wherein:
the plasma confinement system is configured so that the major radius of the confined plasma is 1.5 m or less;
the plasma confinement system includes toroidal field magnets having toroidal field coils made from material comprising high temperature superconductor, the toroidal field magnets being configured such that the magnetic field includes a toroidal component of at least 5 T;
the spherical tokamak comprises a cryostat configured to cool the high temperature superconductor to 30K or less;
wherein the high temperature superconductor is BSCCO or (Re)BCO.

2. The fusion reactor of claim 1, wherein the plasma includes tritium ions.

3. The fusion reactor of claim 1, wherein the plasma includes deuterium ions but not tritium ions.

4. The fusion reactor of claim 1, arranged to ramp up the plasma current using one or more of the following operations:
activation of a one or more solenoids;
RF current drive; and
heating the plasma so that a rapid increase in poloidal field necessary to contain the plasma as it grows inputs almost sufficient flux to ramp up a plasma current to a desired working value.

5. The fusion reactor of claim 4, wherein the one or more solenoids are retractable.

6. The fusion reactor of claim 1 in which one or more of a cryostat casing and material from which the toroidal field magnets are constructed is configured to provide structural integrity.

7. The fusion reactor of claim 1 comprising a central column formed from beryllium or aluminium.

8. The fusion reactor of claim 1 in which an inner part of a central column is made of HTS and an outer part is made of beryllium or aluminium.

9. The fusion reactor of claim 7, wherein the beryllium or aluminium is cryogenically cooled to reduce its resistance and is joined to HTS material forming the remainder of the toroidal field magnets apart from the central column.

10. The fusion reactor of claim 1, further comprising divertors optimised to reduce the load per unit area on the walls of the plasma chamber.

11. The fusion reactor of claim 10, wherein part or all of the surface of the divertors is coated with lithium.

12. The fusion reactor of claim 1, wherein part or all of the surface of the plasma facing wall is coated with lithium.

13. A power station comprising a plurality of fusion reactors as claimed in claim 1.

14. The fusion reactor of claim 1, wherein the material comprising high temperature superconductor comprises one or more tapes, each tape comprising:
a substrate layer;
a plurality of buffer stack layers;
a layer of the high temperature superconductor.

15. The fusion reactor of claim 14, wherein each tape further comprises:
a silver layer;
first and second copper stabiliser layers, located on respective sides of the tape.

16. The fusion reactor of claim 1, wherein the high temperature superconductor is a material which has superconducting properties at temperatures above about 30 K in a low magnetic field.

17. The fusion reactor of claim 1, wherein the toroidal component is between 5 T and 15 T.

* * * * *